US005229027A

United States Patent [19]

Ahmed

[11] Patent Number: 5,229,027

[45] **Date of Patent: * Jul. 20, 1993**

[54] AQUEOUS LIQUID AUTOMATIC DISHWASHING DETERGENT COMPOSITION COMPRISING HYPOCHLORITE BLEACH AND AN IODATE OR IODIDE HYPOCHLORITE BLEACH STABILIZER

[75] Inventor: Fahim U. Ahmed, Plainsboro, N.J.

[73] Assignee: Colgate-Palmolive Company, Piscataway, N.J.

[ * ] Notice: The portion of the term of this patent subsequent to Feb. 9, 2010 has been disclaimed.

[21] Appl. No.: 956,683

[22] Filed: Oct. 2, 1992

Related U.S. Application Data

[63] Continuation of Ser. No. 675,551, Mar. 20, 1991, Pat. No. 5,185,096.

[51] Int. Cl.$^5$ ........................ B08B 3/08; C09K 15/02; C11D 7/02; C11D 7/54

[52] U.S. Cl. ........................................ 252/99; 252/95; 252/102; 252/173; 252/174.14; 252/174.24; 252/174.25; 252/186.35; 252/186.36; 252/186.37; 252/DIG. 14; 423/473; 134/25.2

[58] Field of Search .................. 252/95, 99, 102, 173, 252/174.14, 174.24, 174.25, 186.35, 186.36, 186.37, DIG. 14; 423/473; 134/25.2

[56] References Cited

U.S. PATENT DOCUMENTS

| | | | |
|---|---|---|---|
| 4,113,857 | 9/1978 | Shetty | 252/106 |
| 4,155,975 | 5/1979 | Riley | 422/5 |
| 4,164,477 | 8/1979 | Whitley | 252/99 |
| 4,426,203 | 1/1984 | Abel | 252/95 |
| 4,711,741 | 12/1987 | Fujishima | 252/187.23 |
| 4,756,846 | 7/1988 | Matsuura | 252/156 |
| 4,792,445 | 12/1988 | Rivera | 252/106 |
| 4,834,901 | 5/1989 | Wiesner | 252/95 |
| 4,917,812 | 4/1990 | Cilley | 252/99 |
| 5,164,109 | 11/1992 | Wojtowicz | 252/175 |
| 5,185,096 | 2/1993 | Ahmed | 252/99 |

FOREIGN PATENT DOCUMENTS

| | | | |
|---|---|---|---|
| 1-164701 | 6/1989 | Japan | 423/473 |

*Primary Examiner*—Dennis Albrecht
*Attorney, Agent, or Firm*—Richard E. Nanfeldt; Robert C. Sullivan; Murray Grill

[57] ABSTRACT

The present invention relates to an aqueous liquid automatic dishwashing detergent composition which have improved hypochlorite bleach stability. The detergent composition comprises hypochlorite bleach, a bleach stabilizer, inorganic builder salts, bleach-stable detergent and a thickener. Additionally, the composition provides improved bleach storage stability and its improved hypochlorite bleach functionality. The stabilizer can be a water soluble iodate in an amount sufficient to provide a mole ratio of iodate to available chlorine of 0.08 to 1.67. Alternatively, the stabilizer can be a water soluble iodide/iodine mixture in an iodide to iodine mole ratio of 2:1 to 1:2 present in an amount sufficient to provide a mole ratio of iodide to available chlorine of 0.008 to 0.167.

45 Claims, No Drawings

AQUEOUS LIQUID AUTOMATIC DISHWASHING DETERGENT COMPOSITION COMPRISING HYPOCHLORITE BLEACH AND AN IODATE OR IODIDE HYPOCHLORITE BLEACH STABILIZER

This is a continuation of application Ser. No. 07/675,551 filed Mar. 20, 1991, now U.S. Pat. No. 5,185,096.

FIELD OF THE INVENTION

The present invention relates to an aqueous liquid composition comprising a hypochlorite bleach and a bleach stabilizer. The invention particularly relates to an aqueous liquid automatic dishwasher detergent composition comprising a hypochlorite bleach and a bleach stabilizer.

The present invention more particularly relates to an aqueous liquid automatic dishwasher detergent composition with improved hypochlorite bleach stability properties and with improved chlorine bleach functionality and to a method of using the detergent composition to clean dishware, glassware, china and the like. The dishwashing composition comprises hypochlorite bleach, bleach stabilizer, inorganic builder salts, and optionally a detergent and a thickener. The detergent dishwashing compositions of the present invention exhibit improved hypochlorite bleach stability and improved bleach functionality.

The present invention specifically relates to the use of an iodate chlorine bleach stabilizing agent which stabilizes the hypochlorite bleach against loss of chlorine and its bleach functionality in storage. The hypochlorite bleach and iodate bleach stabilizing agents can be used in bleach compositions, per se, can be used in aqueous liquid detergent compositions for hand washing dishware and in aqueous liquid automatic dishwasher detergent compositions.

The aqueous liquid dishwasher detergent compositions of the present invention can also contain a detergent and thickening agents such as polymeric thickening agents, long chain fatty acids, salts or fatty acids, silica thickening agents, and clay thickening agents for forming stable liquid suspensions suitable for use as liquid automatic dishwasher detergent compositions.

The present invention also specifically relates to aqueous liquid automatic dishwashing detergent compositions having improved hypochlorite bleach stability properties and improved physical stability properties, which are readily dispersible in the washing medium to provide effective cleaning of dishware, glassware, china and the like.

PRIOR ART

Commercially available household-machine dishwasher detergents which are provided in powder form have several disadvantages, e.g. non-uniform composition; costly operations necessary in their manufacture; tendency to cake in storage at high humidities, resulting in the formation of lumps which are difficult to disperse; dustiness, a source of particular irritation to users who suffer allergies; and a tendency to cake in the dishwasher machine dispenser. Liquid forms of dishwashing compositions, however, generally cannot be used in automatic dishwashers due to high foam levels, unacceptably low viscosities and exceedingly high alkalinity.

In addition, the presently used formulated powder detergents frequently require a separate step of hand towel wiping and drying of the dishware, glassware, china and the like to avoid leaving undesirable traces or film of precipitated calcium and magnesium salts on the article being cleaned. The use of liquid detergent compositions presents other problems. The builder salts settle in storage and are not readily redispersed. The compositions also frequently become thicker in storage and are not readily pourable.

For effective use, it is generally recommended that the automatic dishwashing detergent, hereinafter also designated ADD, contain (1) sodium tripolyphosphate (NaTPP) to soften or tie up hard-water minerals and to emulsify and/or peptize soil; (2) sodium silicate to supply the alkalinity necessary for effective detergency and to provide protection for fine china glaze and pattern; (3) sodium carbonate, generally considered to be optional, to enhance alkalinity; (4) a chlorine-releasing bleaching agent to aid in the elimination of soil specks which lead to water spotting; and (5) defoamer/surfactant to reduce foam, thereby enhancing machine efficiency and supplying requisite detergency. See, for example SDA Detergents in Depth, "Formulations Aspects of Machine Dishwashing," Thomas Oberle (1974). Cleansers approximating to the afore-described compositions are mostly liquids or powders. Generally, such compositions omit hypochlorite bleach, since it tends to react with other chemically active ingredients, particularly nonionic surfactant, thereby degrading the suspending or thickening agent and impairing its effectiveness.

In U.K. Patent Application GB 2,116,199A and GB 2,140,450A, both of which are assigned to Colgate-Palmolive, liquid ADD compositions are disclosed which have properties desirably characterizing thixotropic, gel-type structure and which include each of the various ingredients necessary for effective detergency with an automatic dishwasher. The normally gel-like aqueous automatic dishwasher detergent composition having thixotropic properties includes the following ingredients, on a weight basis:

(a) 5 to 35% alkali metal tripolyphosphate;

(b) 2.5 to 20% sodium silicate;

(c) 0 to 9% alkali metal carbonate;

(d) 0.1 to 5% chlorine bleach stable, water dispersible organic detergent active material;

(e) 0 to 5% chlorine bleach stable foam depressant;

(f) chlorine bleach compound in an amount to provide about 0.2 to 4% of available chlorine;

(g) thixotropic thickener in an amount sufficient to provide the composition with thixotropy index of about 2.5 to 10; and (h) sodium hydroxide, as necessary to adjust pH.

ADD compositions so formulated are low-foaming; are readily soluble in the washing medium and most effective at pH values best conductive to improved cleaning performance, viz, pH 10.5–13.5. The compositions are normally of gel consistency, i.e. a highly viscous, opaque jelly-like material having Bingham plastic character and thus relatively high yield values. Accordingly, a definite shear force is necessary to initiate or increase flow, such as would obtain within the agitated dispenser cup of an energized automatic dishwasher. Under such conditions, the composition is quickly fluidized and easily dispersed. When the shear force is discontinued, the fluid composition quickly reverts to a high viscosity, Bingham plastic state closely approximating its prior consistency.

PRIOR ART PROBLEMS

Aqueous liquid compositions comprising hypochlorite bleach are relatively unstable and exhibit a loss in chlorine activity and bleach function in storage. The stability in storage of hypochlorite bleach is affected by the concentration of available chlorine, the storage temperature, the pH value of the composition, the presence of trace metals and the exposure to light. Another problem encountered in loss of chlorine activity and bleach functionability in storage is the addition of various additives to the compositions such as dyes, perfumes and pigments. For example, high chlorine concentrations, high alkalinity and lemon scented products have been found to be more unstable in storage than regular products.

Accordingly, the high alkalinity compositions and the compositions with a high concentration of available chlorine have proven to be less stable in storage than the regular compositions.

ADVANTAGES OVER THE PRIOR ART

The aqueous liquid detergent compositions of the present invention overcome many of the prior art problems associated with powder and liquid detergents. Because of the addition of a small effective amount of iodate bleach stabilizer to the composition the hypochlorite bleach in the composition remains stable for longer periods of time in storage at ambient temperature and at elevated temperature. The aqueous liquid detergent composition has the additional advantages of being stable, non-settling in storage and readily redispersible. The liquid compositions of the present invention are easily pourable, easily measured and easily put into the dishwashing machines.

The iodate bleach stabilizer shows expected improvement in stabilizing compositions having a relatively high available chlorine concentration, for example, 2% available chlorine as compared with a regular 1% available chlorine concentration and compositions having a relatively high caustic (NaOH) concentration 6.83% (50% solution) as compared to regular caustic (NaOH) concentration 2.4% (50% solution).

The compositions also show unexpected improved hypochlorite bleach stability in the presence of lemon scent perfume which in the past has been believed to adversely affect the hypochlorite bleach stability of the compositions in storage.

OBJECTS OF THE PRESENT INVENTION

It is an object of the present invention to provide an aqueous liquid automatic dishwasher detergent composition that has improved hypochlorite bleach stability properties.

It is another object of the invention to provide an aqueous liquid detergent composition which is stable in storage, easily pourable and readily dispersible in the dishwashing water.

A further object of the invention is to provide a method of washing dishware, glassware, china and the like in an automatic dishwashing machine using an aqueous liquid detergent composition with improved chlorine bleach properties by which method the dishware, glassware, china and the like are efficiently and effectively cleaned.

It is a further object of this invention to provide hypochlorite bleach stable aqueous liquid compositions, especially automatic dishwasher detergent compositions, by incorporating in the aqueous compositions a small effective amount of a bleach stabilizer which can be a mixture of iodine and potassium iodide or just potassium iodate. There is also optionally added a minor amount of a fatty acid, metal salt of a fatty acid, silica thickener, polymeric thickener effective to inhibit the settling of the suspended particles and to prevent phase separation.

It is a further object of the present invention to provide improved long term hypochlorite bleach stability and sustained chlorine activity in aqueous liquid bleach compositions by the addition to the compositions of potassium iodate bleach stabilizer or iodine/potassium iodide bleach stabilizer.

It is a still further object of the present invention to provide improved long term hypochlorite bleach stability and sustained chlorine activity in aqueous liquid automatic dishwasher detergent compositions comprising hypochlorite bleach and potassium iodate bleach stabilizer or iodine/potassium iodide bleach stabilizer.

DETAILED DESCRIPTION OF THE INVENTION

These and other objects of the invention which will become more readily understood from the following detailed description of the invention and preferred embodiments thereof are achieved by incorporating in the detergent composition of hypochlorite bleach and a small but effective amount of a metal iodate bleach stabilizer.

In accordance with the present invention there is provided an aqueous liquid automatic dishwasher detergent composition which includes, on a weight basis;

(a) 0 to 40% organic or inorganic builder salt;

(b) 0 to 40% sodium silicate;

(c) chlorine bleach compound in an amount to provide 0.5 to 5% available chlorine;

(d) sufficient metal iodate compound to provide an iodate to available chlorine mole ratio of 0.08 to 1.67;

(e) 0 to 30% alkali metal carbonate;

(f) 0 to 5% stable, water dispersible organic detergent active material;

(g) 0 to 5% chlorine bleach stable foam depressant;

(h) 0 to 3.5% polymeric or inorganic thickener;

(i) 0 to 5% fatty acid or salt thickener;

(j) 0 to 8% sodium hydroxide;

(k) 25 to 75% water.

The mole ratio of metal iodate bleach stabilizer to available chlorine is important in obtaining the improved hypochlorite stabilization benefits realized from the present invention.

The present invention also provides a method for cleaning dishware, glassware and cookware in an automatic dishwashing machine in aqueous wash bath containing an effective amount of an aqueous liquid automatic dishwasher detergent (LADD) composition as described above. According to an embodiment of the invention, the LADD composition can be readily poured into the dispensing cup of the automatic dishwashing machine and will remain within the dispensing cup until subjected to the water spray from the dishwashing machine.

The invention will now be described in greater detail by way of specific embodiments thereof.

In accordance with an embodiment of the present invention an improved aqueous liquid automatic dishwasher detergent composition is prepared by incorporating small amounts of a metal iodate bleach stabilizer in a dishwasher composition containing hypochlorite ion.

Thickened cleaning compositions are highly viscous in a quiescent state, Bingham plastic in nature and have relatively high yield values. When subjected to shear stresses, however, such as being shaken in a container or squeezed through an orifice, they quickly fluidize and upon cessation of the applied shear stress, quickly revert to high viscosity/Bingham plastic state.

The thickened aqueous liquid ADD compositions are low foaming, are readily soluble in the washing medium and most effective at pH values best conducive to improved cleaning performance, viz, pH 10.5 to 13.5. The compositions are normally of gel consistency, i.e. a highly viscous, opaque gel-like material having Bingham plastic character and thus relatively high yield values. Accordingly, a definite shear force is necessary to initiate or increase flow, such as would be obtained within the agitated dispenser cup of an energized automatic dishwasher. Under such conditions, the composition is quickly fluidized and easily dispersed. When the shear force is discontinued, the fluid composition quickly reverts to a highly viscous, Bingham plastic state, closely approximating its prior consistency.

The physical stability of the composition is improved by the addition of a fatty acid, metal salt of a fatty acid, silica thickener, polymeric thickener and/or clay thickener. In a preferred embodiment of the invention there is added to the composition a sufficient amount of long chain fatty acid or metal salt of a long chain fatty acid or metal salt of a long chain fatty acid or either of the foregoing in admixture with a polymeric thickener, selica thickener and/or a clay thixotropic thickener to provide a thixotropic index of about 1 to 15, more preferably 2 to 10 and to inhibit settling of the suspended particles, such as alkali metal salts, etc.

The aqueous thickened LADD products exhibit rheological properties as evaluated by testing product viscosity as a function of shear rate. The compositions exhibited higher viscosity at a low shear rate and lower viscosity at a high shear rate, the data indicating efficient fluidization and gellation well within the shear rates within the standard dishwasher machine. In practical terms, this means improved pouring and processing characteristics as well as less leaking in the machine dispenser-cup, compared to prior liquid or gel LADD products. For applied shear rates corresponding to 3 to 30 rpm, viscosities (Brookfield) correspondingly ranged from about 10,000 to 50,000 cps to about 3,000 to 14,000 cps, as measured at room temperature by means of an LVT Brookfield viscometer after one minute using a No. 4 spindle. A shear rate of 7.4 sec corresponds to a spindle rpm of about 3. An approximate 10-fold increase in shear rate produces about a 3- to 9-fold reduction in viscosity. The property of aqueous thickened LADD products is summarized in terms of a thixotropic index (TI) which is the ratio of the apparent viscosity at 3 rpm and at 30 rpm. The prior compositions have a TI of from 2 to 10. The LADD compositions should exhibit substantial and quick return to prior quiescent state consistency when the shear force is discontinued.

In terms of apparent viscosity, it has been ascertained that so long as the viscosity at room temperature (22°+1° C.) measured in a Brookfield Viscosimeter HATD, using a number 4 spindle at 20 rpm, is less than about 20,000 cps, the composition can be readily shaken so that a thixotropic composition can be easily "fluidized" or "liquefied" to allow the product to be dispensed through a conventional squeeze tube, bottle or other convenient dispenser.

The present invention is based upon the unexpected discovery that substantially improved cleaning properties can be obtained by adding to the aqueous liquid detergent composition a small effective amount hypochlorite bleach stabilizer selected from the potassium iodide/iodine and potassium iodate. The physical stability, i.e., resistance to phase separation, settling, etc. can be improved by adding to the composition a small effective amount of a thickener and stabilizing agent.

The present invention is based upon the unobvious discovery that substantially improved hypochlorite bleach storage stability and hypochlorite bleach functionality can be obtained by adding to an aqueous liquid detergent composition comprising hypochlorite bleach a small effective amount of a metal iodate bleach stabilizer or a metal iodide/iodine bleach stabilizer.

CHLORINE BLEACH COMPOUND

Hypochlorite generating compounds suitable for use in the compositions of the present invention are those water soluble dry solid materials which generate hypochlorite ion on contact with, or dissolution in, water. The preferred hypochlorite compounds are alkali and alkaline earth hypochlorites, for example, sodium potassium and lithium hypochlorites and calcium hypochlorites.

The hypochlorite generating compounds are generally soluble in the product composition. Examples thereof are the dry, particulate heterocyclic N-chlorimides such as trichlorocyanuric acid, dichlorocyanuric acid and salts thereof such as sodium dichlorocyanurate and potassium dichlorocyanurate. The corresponding dichloroisocyanuric and trichloroisocyanic acid salts can also be used. Other N-chloroimides may be used such as N-chlorosuccinimide, N-chlorophthalimide and N-chloronaphthalimide. Additional suitable N-chloroimides are the hydantoins such as:

1,3-dichloro-5,5-dimethylhydantion;
N-monochloro-5,5-dimethylhydantoin;
methylene-bis (N-chloro-5,5-dimethylhydantoin);
1,3-dichloro-5-methyl-5-isobutylhydantoin;
1,3-dichloro-5-methyl-5-ethylhydantoin;
1,3-dichloro-5,5-diisobutylhydantoin;
1,3-dichloro-5-methyl-5-n-amylhydantoin;

and the like. Other useful hypochlorite-liberating agents are trichloromelamine and dry, particulate, water soluble anhydrous inorganic salts such as lithium hypochlorite and calcium hypochlorite. The hypochlorite liberating agent may, if desired, be a stable, solid complex or hydrate such as sodium p-toluene -sulfo-chloramine-trihydrate (choramine-T), sodium benzene-sulfo-chloramine-dihydrate, calcium hypochlorite tetrahydrate, or chlorinated trisodium phosphate containing 0.5 to 5% available chlorine produced by combining trisodium phosphate in its normal $Na_3PO_4.12H_20$ form and an alkali metal hypochlorite (e.g., sodium hypochlorite).

The preferred sources of hypochlorite are dichloro- and trichloroisocyanurates, sodium hypochlorite, lithium hypochlorite, calcium hypochlorite and chloramine-T (p-Toluenesulfochloramine).

Typically the instant chlorine-liberating agents, such as sodium dichloroisocyanurate dihydrate, are employed in a proportion of about 1 to 15% by weight of the composition, and preferably about 1.0 to 10% and more preferably 2 to 6.5%. Sodium hypochlorite chlorine liberating agent is employed in a proportion of about 1 to 40% by weight of the composition, and preferably about 4.0 to 29% and more preferably 4 to 25%.

The composition should contain sufficient chlorine bleach compound to provide about 0.5 to 5.0% by weight of available chlorine, as determined, for example, by acidification of the composition with sulfuric acid and iodometric titration with sodium thiosulfate monitored by a potentiometer. A composition containing about 0.9 to 9% by weight of sodium dichloroisocyanurate dihydrate contains or provides about 0.5 to 5% available chlorine. A composition containing about 1.8 to 6.25% by weight sodium dichloroisocyanurate dihydrate contains about 1 to 3.5% by weight of available chlorine and is especially preferred. A composition containing about 1.6 to 5.6% by weight calcium hypochlorite contains about 1 to 3.5% by weight available chlorine. A composition containing about 3.6 to 36% by weight of sodium hypochlorite contains about 0.5 to 5% by weight of available chlorine. A composition containing about 7.4 to 22.20% by weight of sodium hypochlorite contains about 1 to 3% by weight of available chlorine.

Desirably the proportion of chlorine-liberating compound employed will be such as to yield a product which contains from about 0.5% to about 5% available chlorine on a total weight basis, preferably 1 to 4% and more preferably 1 to 3.5% available chlorine.

CHLORINE BLEACH STABILIZING AGENT

The chlorine bleach stabilizing agent comprises a water soluble metal iodate compound. Suitable water soluble metal iodate compounds are alkali and alkaline earth metal iodates, for example; sodium, potassium and lithium iodates and calcium iodates.

The water soluble potassium iodate can be used in amounts of 0.5 to 10.0 wt. %, preferably 1.5 to 7.5 wt. % and more preferably 2.15 to 5.50 wt. % per 1% available chlorine. The mole ratio of iodate to available chlorine is important and can be 0.08 to 1.67, preferably 0.25 to 1.25 and more preferably 0.36 to 0.92. The mole ratio of iodate to 1% available chlorine can be used in amount 0.002 to 0.047, preferably 0.007 to 0.035 and more preferably 0.01 to 0.026.

The preferred iodate bleach stabilizer is potassium iodate ($KIO_3$).

In another embodiment of the invention a mixture of $KI/I_2$ is used as the bleach stabilizing agent. It has been unexpectedly and surprisingly found that when using $KI/I_2$ as the bleach stabilizing agent only about one tenth of the molar amount of the iodine is required to obtain the same degree of chlorine bleach stability.

The iodine ($I_2$) is only slightly soluble in water. The potassium iodide (KI) is water soluble and helps to increase the water solubility of the iodine ($I_2$). Other water soluble alkaline metals such as sodium and lithium can be used in place of potassium iodide, i.e. sodium and lithium iodide can be used.

The mole ratio of potassium iodide to iodine ($KI/I_2$) can be 1:2 to 2:1, and is preferably about 1:1.

The amount of the potassium iodide used can be 0.037 to 0.78 wt %, preferably 0.12 to 0.58 wt % and more preferably 0.17 to 0.43 wt % per 1% available chlorine. The amount of the iodine used can be 0.057 to 1.20 wt %, preferably 0.18 to 0.90 wt %, and more preferably 0.26 to 0.65 wt % per 1% available chlorine.

The mole ratio of potassium iodide to available chlorine can be 0.008 to 0.167, preferably 0.025 to 0.125, and more preferably 0.036 to 0.092. The mole ratio of iodine to available chlorine can be 0.008 to 0.167, preferably 0.025 to 0.125, and more preferably 0.036 to 0.092. The millimole ratio of iodine and KI (potassium iodide) to 1% available chlorine can be used in amount 0.224 to 4.70, preferably 0.70 to 3.50 and more preferably 1.01 to 2.60.

This invention is not to be limited by the following discussion, it is believed that the potassium iodate ($KIO_3$) reacts with the hypochlorite bleach in the aqueous liquid bleach composition and in the aqueous liquid dishwasher detergent composition to form potassium periodate ($KIO_4$).

It is also believed that the potassium iodide/iodine react with the hypochlorite bleach in the aqueous liquid bleach composition and in the aqueous liquid dishwasher detergent composition to first form potassium iodate ($KIO_3$) and to then form potassium periodate ($KIO_4$).

The potassium iodate and the potassium iodide/iodine amounts given above and in the examples are the amounts of the respective ingredients as originially added to the compositions and for purposes of simplicity the description of the present invention is given in terms of the ingredients as initially added to the compositions.

It is unexpected and surprising to find that only about one tenth of the molar amount of potassium iodide/iodine is as effective as the molar amount of potassium iodate in stabilizing the hypochlorite bleach.

THICKENERS

The thickeners or suspending agents than can be used in accordance with the present invention to provide the aqueous medium with thickened properties may be organic, for example, fatty acid or fatty acid metal salts or polymeric thickeners or inorganic colloid forming clay materials or silica type thickeners such as Cab-O-Sil. The thickeners should be stable to high alkalinity and stable to chlorine bleach compounds such as sodium hypochlorite. The preferred thickeners comprise the fatty acids, the fatty acid polyvalent metal salts and the inorganic, colloid-forming clays of smectite and/or attapulgite types. The amount of the thickener used will depend on the particular thickener used, but sufficient thickener is added to the formulation to provide the composition with a thixotropy index of about 1 to 15, more preferably about 2 to about 10.

The preferred fatty acid thickeners are the higher aliphatic fatty monocarboxylic acids having from about 8 to about 22 carbon atoms, more preferably from about 10 to 20 carbon atoms, and especially preferably from about 12 to 18 carbon atoms, inclusive of the carbon atom of the carboxyl group of the fatty acid. The aliphatic radicals are saturated and can be straight or branched and can contain functional groups such as hydroxy, ester or dialkylamide groups affixed to the saturated chain. Straight chain saturated fatty acids are preferred. Mixtures of fatty acids may be used, such as those derived from natural sources, such as tallow fatty acid, coco fatty acid, soya fatty acid, etc., or from synthetic sources available from industrial manufacturing processes. The fatty acids should be fully saturated in order to prevent undesireable reaction with the hypochlorite.

Thus, examples of the fatty acids which can be used as thickeners include, for example, decanoic acid, lauric acid, dodecanoic acid, palmitic acid, myristic acid, stearic acid, oleic acid, eicosanoic acid, tallow fatty acid, coco fatty acid, soya fatty acid and mixtures of these acids. Stearic acid and mixed fatty acids, e.g. coco fatty acid, are preferred.

Generally, the amounts of the fatty acid thickener agent that can be used are in the range of from about 0.02 to 3%, preferably from about 0.03 to 2.5%, especially preferably from about 0.05 to 2.0%, provide the desired long term stability and absence of phase separation.

The metal salts of the above fatty acids can also be used in the present invention as thickener agents. Suitable fatty acid, metal salt fatty acid and clay thixotropic thickeners are disclosed in U.S. Pat. No. 4,889,653 dated Dec. 16, 1989 in the name of Ahmed and Buck, which is incorporated herein in its entirety by reference thereto.

The preferred metals are the monovalent metals such as lithium, sodium and potassium and the polyvalent metals such as magnesium, calcium, aluminum and zinc. The calcium and magnesium salts are especially preferred as generally safe food additives.

Many of the metal salts are commercially available. For example, the aluminum salts are available in the triacid form, e.g. aluminum stearate as aluminum tristearate, $Al(C_{17}\text{-}H_{35}COO)_3$. The monoacid salts, e.g. aluminum monostearate, $Al(OH)_2(C_{17}\text{-}H_{35}COO)$ and diacid salts, e.g. aluminum distearate, $Al(OH)(C_{17}\text{-}H_{35}COO)_2$, and mixtures of two or three of the mono-, di- and triacid salts can be used for those metals, e.g. Al, with valences of +3, and mixtures of the mono- and diacid salts can be used for those metals, e.g. Zn, with valences of +2.

Calcium stearate, i.e. calcium distearate, magnesium stearate, i.e. magnesium distearate, aluminum stearate, i.e. aluminum tristearate, and zinc stearate, i.e. zinc distearate, are the preferred polyvalent fatty acid salt stabilizers and sodium stearate and potassium stearate are the preferred monovalent fatty acid salt stabilizers.

Generally, the amounts of the polyvalent metal fatty acid salt stabilizing agents in the range of from about 0.02 to 2%, preferably from about 0.06 to 1.5%, especially preferably from about 0.08 to 1.0%, provide the long term stability and absence of phase separation upon standing or during transport at both low and elevated temperatures as are required for a commercially acceptable product.

There may also be used in the present invention the conventional inorganic thixotropic clay thickeners or polymeric thickeners. The clay thickeners may be used in small amounts in combination with the fatty acid thickeners or in combination with fatty acid polyvalent metal salt thickeners. The clays, however, may be used by themselves as the thickeners.

The preferred clay thickeners comprise the inorganic, colloid forming clays of smectite and/or attapulgite types.

Smectite clays include montmorillonite (bentonite), hectorite, attapulgite, smectite, saponite, and the like. Montmorillonite clays are preferred and are available under tradenames such as Thixogel (Registered Trademark) GP, H, etc., from Luthern Clay Products. Attapulgite clays include the materials commercially available under the tradename Attagel (Registered Trademark), i.e. Attagel 40, Attagel 50 and Attagel 150 from Engelhard Minerals and Chemicals Corporation. Mixtures of smectite and attapulgite types in weight ratios of 4:1 to 1:5 are also useful herein. Thickening or suspending agents of the foregoing types are well known in the art.

When used in combination with the fatty acids or the fatty acid polyvalent metal salts, the clay thickeners are used in amounts of 0.1 to 3%, preferably 0.1 to 2.5% and more preferably in amounts of 0.1 to 2%.

When the clay thickeners are used alone as the thickener agent they can be used in amounts of about 1.5 to 8%, preferably 2 to 5% and more preferably 1 to 2.5% by weight of the formulation.

Exemplary of the polymeric thickening agents are cross-linked polyacrylic acid type thickening agents sold by B. F. Goodrich under their Carbopol trademark, including both the 900 series resins, especially Carbopol 941, which is the most ion-insensitive of this class of polymers, and Carbopol 940 and Carbopol 934, and the 600 series resums, especially Carbopol 614. The Carbopol 600 and 900 series resins are hydrophilic high molecular weight, cross-linked acrylic acid polymers having an average equivalent weight of 76, and the general structure illustrated by the following formulas:

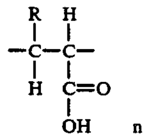

wherein R can be hydrogen or an alkyl chain. Carbopol 941 has a molecular weight of about 1,250,000; Carbopol 940 has a molecular weight of approximately 3,000,000. The Carbopol 900 series resins are highly branched chained and highly cross-linked with polyalkenyl polyether, e.g. about 1% of a polyalkyl ether of sucrose having an average of about 5.8 alkyl groups for each molecule of sucrose. The preparation of this class of cross-linked carboxylic polymers is described in U.S. Pat. No. 2,798,053, the disclosure of which is incorporated by reference. Further detailed information on the Carbopol 900 series resins is available from B. F. Goodrich, see, for example, the B. F. Goodrich catalog GC-67, Carbopol R Water Soluble Resins.

In general, these thickening resins are preferably copolymers of a water dispersible copolymer of an alpha-beta monoethylenically unsaturated lower aliphatic carboxylic acid cross-linked with a polyether of a polyol selected from oligo saccharides, reduced derivatives thereof in which the carbonyl group is converted to an alcohol group and pentaerythritol, the hydroxyl groups of the polyol which are modified being etherified with alkyl groups, there being preferably at least two such alkyl groups per molecule.

These water-dispersible cross-linked thickening resins as described in the aforementioned U.S. Pat. No. 2,798,053 and which have been commercialized by B. F. Goodrich as the Carbopol 900 series resins are prepared from essentially linear copolymers. More recently, B. F. Goodrich has introduced the Carbopol 600 series resin. These are high molecular weight, moderately branched chain polyacrylic acid cross-linked with polyalkenyl ether. In addition to the branched nature of these resins, they are also believed to be more highly cross-linked than the 900 series resins and have molecular weights between about 1,000,000 and 4,000,000.

Most especially useful of the Carbopol 600 series resins is Carbopol 614 which is the most chlorine bleach stable of this class of thickening resins. Carbopol 614 is also highly stable in the high alkalinity environment of the preferred liquid automatic dishwasher detergent compositions and is also highly stable to any anticipated storage temperature conditions from below freezing to elevated temperatures as high as 120° F., preferably 140° F., and especially 160° F., for periods of as long as several days to several weeks or months or longer.

While the most favorable results have now been achieved with Carbopol 614 moderately branched chain polyacrylic resin, other branched cross-linked polycarboxylate-type thickening agents can also be used in the compositions of this invention. As used herein "polycarboxylate-type" refers to water-soluble carboxyvinyl polymers of alpha, beta monoethylenically unsaturated lower aliphatic carboxylic acids, which may be linear or non-linear, and are exemplified by homopolymers of acrylic acid or methacrylic acid or water-dispersible or water-soluble salts, esters or amides thereof, or water-soluble copolymers of these acids or their slats, esters or amides with each other or with one or more other ethylenically unsaturated monomers, such as, for example, styrene, maleic acid, maleic anhydride, 2-hydroxyethylacrylate, acrylonitrile, vinyl acetate, ethylene, propylene, and the like, and which have molecular weights of from about 500,000 to 10,000,000 and are cross-linked or interpolymerized with a multi-vinyl or multi-acrylic functionalized cross-linking agent, especially with a polyhydric compound.

These homopolymers or copolymers are characterized by their high molecular weight, in the range of from about 500,000, especially from 1,000,000 to 4,000,000, and by their water solubility, generally at least to an extent of up to about 5% by weight, or more, in water at 25° C.

The at least one thickening agent is used in their cross-linked form, wherein the cross-linking may be accomplished by means known in the polymer arts, as by irradiation, or, preferably, by the incorporation into the monomer mixture to be polymerized of known chemical cross-linking monomeric agents, typically polyunsaturated (e.g. diethylenically unsaturated) monomers, such as, for example, divinylbenzene, divinylether of diethylent glycol, $N,N^1$-methylenebisacrylamide, polyalkenylpolyethers (such as described above), and the like. Typically, amounts of cross-linking agent to be incorporated in the final polymer may range from about 0.01 to about 5 percent, preferably from about 0.05 to about 2 percent, and especially, preferably from about 0.1 to about 1.5 percent, by weight of cross-linking agent to weight of total polymer. Generally, those skilled in the art will recognize that the degree of cross-linking should be sufficient to impart some coiling of the otherwise generally linear or non-linear polymeric compound while maintaining the cross-linked polymer at least water dispersible and highly water-swellable in an ionic aqueous medium.

The amount of the at least one branched chained cross-linked polymeric acid or other high molecular weight, hydrophilic cross-linked polycarboxylate thickening agent and to impart the desired rheological property of linear viscoelasticity will generally be in the range of from about 0.1 to 0.7%, preferably from about 0.2 to 0.6% by weight, based on the weight of the composition, although the amount will depend on the particular cross-linking agent, ionic strength of the composition, hydroxyl doners and the like.

It is preferred herein that the pH of the aqueous liquid ADD composition product liquid be at least about 9.5, more preferably from about 10.5 to 13.5 and most preferably at least about 11.5. At the relatively lower pH values, the LADD product is too viscous, i.e. solid-like, and thus not readily fluidized under the shear-force levels created within the dispenser cup under normal machine operating conditions. NaOH is thus often added to increase the pH to within the above ranges, and to increase flowability properties. Caustic soda (NaOH) serves the further function of neutralizing the phosphoric or phosphonic acid ester foam depressant when present. About 0.5 to 9 wt % of NaOH (50% solution) is typical.

BUILDERS SALTS

The amount of alkali metal silicate added and the amount of alkali metal TPP added can be adjusted to obtain the desired alkalinity. Sodium carbonate can be added to act as a builder salt or as a buffer to maintain the desired pH level in the wash bath. The sodium carbonate can be added in an amount of 0 to 30 wt. %, preferably 5 to 25 wt. % and typically about 10 to 20 wt. % of the detergent composition.

A preferred builder salt is an alkali metal polyphosphate such as sodium tripolyphosphate ("TPP") or potassium tripolyphosphate ("KTPP") or a mixture thereof. In place of all or part of the alkali metal polyphosphate one or more other detergent builder salts can be used. Suitable other builder salts are alkali metal borates, phosphates and bicarbonates.

Specific examples of such builders are sodium tetraborate, sodium pyrophosphate, potassium pyrophosphate, sodium bicarbonate, sodium hexametaphosphate, sodium sesquicarbonate, sodium mono and diorthophosphate and potassium bicarbonate.

The builder salt, e.g. NaTPP or KTTP or mixtures thereof optionally may be employed in the LADD composition in an amount less than about 40%, preferably about 8 to 40 wt. %, and more preferably about 15 to 35 wt. %. The NaTPP or KTTP may be anhydrous or hydrated, including the stable hexahydrate with a degree of hydration of 6 corresponding to about 18% by weight of water or more.

The NaTPP or KTTP may be replaced in whole or in part by organic builder salts. Since the compositions of this invention are generally highly concentrated, and, therefore, may be used at relatively low dosages, it is desirable to supplement any phosphate builder (such as sodium tripolyphosphate) with an auxiliary builder such as an alkali metal polycarboxylic acid. Suitable alkali metal polycarboxylic acids are alkali metal salts of citric and tartaric acid, e.g. monosodium and disodium citrate (anhydrous). The sodium salts of citric and tartaric acids are preferred.

The sodium silicate, which provides alkalinity and protection of hard surfaces, such as fine china is optionally employed in an amount ranging from less than about 40 wt. %, preferably about 2.4 to 40 wt. %, and more preferably about 8 to 35 wt. %, in the composition. The sodium silicate also protects the washing machine from corrosion. The sodium silicate can have a $Na_2O:SiO_2$ ratio of 1.6/1 to 1/3.2. The sodium silicate can be added in the form of an aqueous solution, preferably having a $Na_2O:SiO_2$ ratio of from 1/1 to 1/2.8, for example, 1/2.4. Potassium silicates of the same ratios can also be used. The preferred alkali metal silicates are sodium disilicate and sodium metasilicate.

FOAM INHIBITORS

Foam inhibition is important to increase dishwasher machine efficiency and minimize destabilizing effects which might occur due to the presence of excess foam within the washer during use. Foam may be sufficiently reduced by suitable selection of the type and/or amount of detergent active material, the main foam-producing component. However, it is generally preferred to include a chlorine bleach stable foam depressant or inhibitor. Particularly effective are the alkyl or ethoxylated alkyl phosphoric acid esters of the formula available, for example,

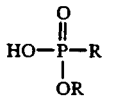

from BASF-Wyandotte (PCUK-PAE), and especially the alkyl acid phosphate esters of the formula available, for example, from

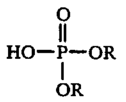

Hooker (SAP) and Knapsack (LPKN-158), in which one or both R groups in each type of ester may represent independently a $C_{12-20}$ ethoxylated alkyl or alkyl group. Mixtures of the two types, or any other chlorine bleach stable types, or mixtures of mono- and di-esters of the same type, may be employed. Especially preferred is a mixture of mono- and di-$C_{16-18}$ alkyl acid phosphate esters such as monostearyl/distearyl acid phosphates 1.2/1 (Knapsack). When employed, proportions of 0.01 to 5 wt.%, preferably 0.1 to 5 wt.%, especially about 0.1 to 0.5 wt.%, of foam depressant in the composition are typical. Other defoamers which may be used include, for example, the known silicones such as Dow Corning DC 1400.

Most of the components of the composition, for example, the hypochlorites, iodates and foam depressant can be added in the form of dry powders or aqueous dispersions or solutions.

SURFACTANT DETERGENTS

The liquid nonionic surfactant detergents that can be used in the practice of the present are preferably the low foaming poly-lower alkoxylated lipophiles.

Useful nonionics are represented by the low foam Plurafac series from BASF Chemical Company which are the reaction product of a higher linear alcohol and a mixture of ethylene and propylene oxides, containing a mixed chain of ethylene oxide and propylene oxide and propylene oxide, terminated by a hydroxyl group. Examples include a $C_{13}$–$C_{15}$ fatty alcohol condensed with 6 moles ethylene oxide and 3 moles propylene oxide, a $C_{13}$–$C_{15}$ fatty alcohol condensed with 7 moles propylene oxide and 4 moles ethylene oxide and a $C_{13}$–$C_{15}$ fatty alcohol condensed with 5 moles propylene oxide and 10 moles ethylene oxide. Another group of low foam liquid nonionics are available from Shell Chemical Company, Inc. under the Dobanol trademark: Dobanol 91-5 is a low foam ethoxylated $C_9$–$C_{11}$ fatty alcohol with an average of 5 moles ethylene oxide and Dobanol 25-7 is an ethoxylated $C_{12}$–$C_{15}$ fatty alcohol with an average of 7 moles ethylene oxide.

Other useful surfactants are Neodol 25-7 and Neodol 25-6.5, which products are made by Shell Chemical Company, Inc. The former is a condensation product of a mixture of higher fatty alcohols averaging about 12 to 15 carbon atoms, with about 7 moles of ethylene oxide and the latter is a corresponding mixture wherein the carbon atom content of the higher fatty alcohol is 12 to 13 and the number of ethylene oxide groups present averages about 6.5. The higher alcohols are primary alkanols. Other examples of such detergents include Tergitol 15-S-7 and Tergitol 15-S-9 (registered trademarks), both of which are linear secondary alcohol ethoxylates made by Union Carbide Corp. The former is mixed ethoxylation product of 11 to 15 carbon atoms linear secondary alkanol with seven moles of ethylene oxide and the latter is a similar product but with nine moles of ethylene oxide being reacted.

A preferred nonionic surfactant is available from Union Carbide Corporation under the trademark Tergitol MDS-42. This nonionic surfactant is a $C_{12}$–$C_{14}$ linear alcohol containing 55% by weight random distributed oxyalkyl groups of which 42% are ethoxy and 58% propoxy groups.

Other useful nonionic surfactants are the Poly-Tergent S-LF surfactants available from Olin Corporation. These surfactants are low foaming, biodegradable linear fatty alcohols. Surfactants of this type are available under the tradenames Poly-Tergent S-LF 18, Poly-Tergent S-305-LF, Poly-Tergent S-405-LF and Poly-Tergent CS-1. Other biodegradable nonionic surfactants are synperionic LF RA30, LF D25 from ICI can be used also.

Mixtures of two or more of the liquid nonionic surfactants can be used and in some cases advantages can be obtained by the use of such mixtures.

The detergent active materials used herein must be stable in the presence of the hypochlorite bleach. In addition to the above discussed nonionic surfactants, anionic surfactants can also be used.

The anionic surfactants that can be used are the linear or branched alkali metal mono- and/or di-($C_8$–$C_{14}$) alkyl diphenyl oxide mono and/or disulphonates, commercially available for example as DOWFAX (Registered Trademark) 3B-2 and DOWFAX 2A-1.

Other suitable surfactants include the primary alkylsulphates, alkylsulphonates, alkylaryl-sulphates and sec. alkylsulphates. Examples include sodium $C_{10}$–$C_{18}$ alkyl sulphates such as sodium dodecyl sulphate and sodium tallow alcohol sulphate; sodium $C_{10}$–$C_{18}$ alkane sulphonates such as sodium hexadecyl sulphonate and sodium $C_{12}$–$C_{18}$ alkylbenzene sulphonates such as sodium dodecylbenzene sulphonates. The corresponding potassium salts may also be employed.

The nonionic and anionic surfactants are optionally used in amount of less than about 5.0%, for example about 0.1 to 5.0%, preferably about 0.2 to 3.0%.

Various conventional ingredients may be included in these compositions in small amounts, generally less than about 3 wt.%, such as perfume, e.g. lemon scent, hydrotropic agents such as the sodium benzene, toluene, xylene and cumene sulphonates, preservatives, dyestuffs and pigments and the like, all of course being stable to chlorine bleach compound and high alkalinity (properties of all the components). Especially preferred for coloring are the chlorinated phthalocyanines and polysulphides of aluminosilicate which provide, respectively, pleasing green and blue tints.

It is believed that some of the additives increase the chlorine, i.e. hypochlorite bleach, instability in storage. One such additive is the lemon scent. The chemical formula of lemon scent is Highlights 3 from Bush, Boake & Allen.

Trace metal impurities in the ingredients, for example in the NaTPP builder salt silicates and in the clay thickener are also believed to increase the instability of the chlorine bleach in storage. Trace metals such as Co, Ni, Cu and iron are believed even in very small amounts to increase the instability of the chlorine bleach in storage.

The aqueous liquid LADD compositions of this invention are readily employed in know manner for washing dishes, glasses, cups, cookware, eating utensils and the like by hand washing, and in an automatic dishwasher, provided with a suitable detergent dispenser, in an aqueous wash bath containing an effective amount of the detergent composition.

The amount of water contained in these compositions should, of course, be neither so high as to produce unduly low viscosity and high fluidity, nor so low as to produce unduly high viscosity and low fluidity. Such amount is generally within the range of from about 25 to 75 wt.% &, preferably about 50 to 60 wt.%. The water should also preferably be deionized or softened. These amounts of water in the composition include the water added as part of the liquid solutions or of other ingredients, but do not include bound water, for example that in NaTPP hexahydrate.

In an embodiment of the present invention an aqueous liquid bleach composition is formulated using the below named ingredients.

| Ingredient | Wt. % |
|---|---|
| Water | 25–75 |
| Sodium Carbonate | 3–10 |
| Sodium Hydroxide (50%) | 2–9 |
| Sodium Hypochlorite | 7–56 |
| Potassium Iodate | 0.5–80 |
| Color | 0.002–1 |
| Perfume | 0.2–2 |

(1) Available chlorine 1 to 5 wt. %.
(2) Mole ratio of potassium iodate to available chlorine 0.08 to 1.67.

The chlorine bleach compositions of the present invention can contain conventional bleach composition additives. The compositions can be prepared with commerically available chlorine bleach compounds and commercially available water soluble iodate bleach stabilizing agents.

The chlorine bleach compositions can be used as a bleach, per se, for example to bleach laundry, can be added to a wash containing laundry detergents and can be added to a dishwasher detergent composition.

In another embodiment of the present invention a concentrated automatic dishwasher detergent composition, comprising a water-soluble iodate bleach stabilizer is formulated using the below named ingredients.

| Typically Component | Generally Wt. % | Wt. % |
|---|---|---|
| Water | 25–75 | 35–65 |
| Sodium Tripolyphosphate/ | 10–40 | 20–30 |

-continued

| Typically Component | Generally Wt. % | Wt. % |
|---|---|---|
| Potassium Tripolyphosphate | | |
| Sodium Carbonate | 0–15 | 3–10 |
| Sodium Hydroxide (50%) | 0–12 | 2–9 |
| Surfactant | 0–5 | 0.5–3 |
| Sodium Silicate | 0–40 | 15–40 |
| Sodium Hypochlorite (1) | 7 to 28 | 8 to 16 |
| Potassium Iodate (2) | 0.5 to 40 | 1 to 20 |
| Clay Thickener | 0–3.5 | 0.03–3 |
| Fatty Acid/Fatty Acid Salt Thickener | 0–2 | 0.02–2 |
| Silica Thickener | 0–3.5 | 0.03–5 |
| Polymeric Thickener | 0–10 | 0.1–3 |
| Color | 0 to 0.008 | 0.002 to .004 |
| Perfume | 0 to 2 | 0.02 to 1 |

(1) Available chlorine is 1% to 4%, typically 1% to 2% available chlorine used. A 7.4% NaC10 (13.51% available chlorine) in the formula gives 1% available chlorine.
(2) Mole ratio of potassium iodate to available chlorine is 0.08 to 1.67 and .002 mole to .047 mole of $KIO_3$ per 1% available chlorine and 0.5 to 10% wt. % of $KIO_3$ per 1% available chlorine.

(2) Mole ratio of potassium iodate to available chlorine is 0.08 to 1.67 and 0.002 mole to 0.047 mole of $KIO_3$ per 1% available chlorine and 0.5 to 10% wt. % of $KIO_3$ per 1% available chlorine.

In another embodiment of the present invention a concentrated automatic dishwasher detergent comprising potassium iodide/iodine bleach stabilizer is formulated using the below named ingredients.

| Component | Generally Wt. % | Typically Wt. % |
|---|---|---|
| Water | 25–75 | 35–65 |
| Sodium Tripolyphosphate/ Potassium Tripolyphosphate | 10–40 | 20–30 |
| Sodium Carbonate | 0–15 | 3–10 |
| Sodium Hydroxide (50%) | 0–12 | 2–9 |
| Surfactant | 0–5 | 0.5–3 |
| Sodium Silicate | 0–40 | 15–40 |
| Sodium Hypochlorite (1) | 7 to 28 | 8 to 16 |
| Potassium Iodide (2), (3) | 0.037 to 3.1 | 0.04 to 1.56 |
| Iodine | 0.057 to 4.76 | 0.06 to 2.38 |
| Clay Thickener | 0–3.5 | 0.03–3.0 |
| Fatty Acid/Fatty Acid Salt Thickener | 0–2 | 0.02–2 |
| Silica Thickener | 0–3.5 | 0.03–5 |
| Polymeric Thickener | 0–10 | 0.1–3 |
| Color | 0 to 0.008 | 0.002–.004 |
| Perfume | 0 to 2 | 0.02 to 1 |

(1) Available chlorine is 1 to 4%, typically 1% to available chlorine. A 7.4% $NaClO_3$ (13.5% available chlorine) in the formula gives 1% available chlorine.
(2) Mole ratio of potassium iodide to iodine is 2:1 to 1:2, about 1:1, respectively.
(3) Mole ratio of potassium iodide/iodine to available chlorine is 0.008 to 0.167 and 0.224 to 4.70 millimole of $KI/I_2$ to 1% available chlorine and .06 to 1.19% wt. % iodine and 0.037 to 0.78 wt. % KI per 1% available chlorine.

(1) Available chlorine is 1 to 4%, typically 1% to available chlorine. A 7.4% $NaClO_3$ (13.5% available chlorine) in the formula gives 1% available chlorine.

(2) Mole ratio of potassium iodide to iodine is 2:1 to 1:2, about 1:1, respectively.

(3) Mole ratio of potassium iodide/iodine to available chlorine is 0.008 to 0.167 and 0.224 to 4.70 millimole of $KI/I_2$ to 1% available chlorine and 0.06 to 1.19% wt. % iodine and 0.037 to 0.78 wt. % KI per 1% available chlorine.

The aqueous liquid formulations, for example the non-thickened formulations can be prepared using the conventional blending and mixing procedures used for the preparation of aqueous liquid detergent compositions. Suitable mixing procedures that can be used are described in Drapier et al U.S. Pat. No. 4,752,409 and in applicants' U.S. Pat. No. 4,968,445, both of which are incorporated herein in their entirety by reference thereto.

The method of mixing the ingredients of the compositions of the present invention can be conventionally used mixing procedures. The water soluble iodate and the water soluble iodide/iodine bleach stabilizing agents can be added during the last mixing step.

The stabilized bleach composition of the present invention can also be incorporated in the aqueous liquid viscoelastic automatic dishwasher compositions described in the copending related application of Dixit et al Ser. No. 353,712, filed May 18, 1989, which is incorporated herein by reference thereto.

The thickened aqueous liquid stabilized bleach automatic dishwasher detergent compositions of the present invention can contain conventional dishwashing detergent additives. The formulations can be prepared with commercially available solid powder builders, and/or the ingredients can be mixed and the formulations ground to a desired particle size. All amounts and proportions referred to herein are percent by weight of the composition unless otherwise indicated.

The invention may be put into practice in various ways and a number of specific embodiments will be described to illustrate the invention with reference to the accompanying examples.

DETAILED DESCRIPTION OF THE INVENTION

EXAMPLE 1

In accordance with the present invention aqueous liquid automatic dishwasher detergent compositions were prepared using the below named ingredients in the amounts indicated.

The Composition A is an inventive composition with potassium iodate and with high alkalinity and high bleach content. The Comparative Composition I is prepared without potassium iodate.

| Ingredients | Invention Composition A | Comparison Composition I |
|---|---|---|
| Deionized Water | Q.S. | Q.S. |
| Sodium Tripolyphosphate-Hydrated | 12.00 | 12.00 |
| Sodium Tripolyphosphate-Anhydrous | 12.00 | 12.00 |
| Sodium Carbonate | 5.00 | 5.00 |
| Sodium Hydroxide (50%) | 6.83 | 6.83 |
| Dowfax 3B2 Surfactant | 1.0 | 1.0 |
| Sodium Silicate (1) | 20.83 | 20.83 |
| Sodium Hypochlorite (2) | 15.4 | 15.4 |
| Potassium Iodate (3) | 2.10 (4.21) | — |
| Aluminum Stearate | 0.13 | 0.13 |
| Gel White H Clay | 1.25 | 1.25 |
| LpKn 158 Defoamer | 0.16 | 0.16 |
| Graphtal Green Pigment | 0.002 | 0.002 |

(1) $Na_2O:SiO_2$,1:2.4; (47.5% solution)
(2) Available chlorine 2.0 wt. %
(3) Two inventive compositions A were prepared, the first with (1) 2.10 wt. % and the second with (2) 4.21 wt. % potassium iodate.

The mole ratio of potassium iodate to available chlorine is 0.18 and 0.36, respectively.

The loss in chlorine activity of the hypochlorite bleach in the inventive Compositions A (high alkalinity/high bleach) and the Comparison Composition I were monitored and at ambient temperature (68° F.) at 100° F. for five (5) months. The results in available chlorine loss, i.e. loss in chlorine activity are reported below in Table 1.

TABLE 1

| | 100° F. Temp. | Potassium Iodate Stabilizing Agent Wt. % | Mole Ratio Stabilizing Agent To Avail. Chlorine | 68° F. (Amb.) Temp. |
|---|---|---|---|---|
| Comparison Comp. I | 87% | 0 | — | 48% |
| Invention Comp. A (1) | 57% | 2.10 | 0.18 | 34% |
| Invention Comp. A (2) | 39% | 4.21 | 0.36 | 8% |

The inventive Composition A (1) at ambient temperature had a stability improvement of 14%, and at 100° F. had a stability improvement of 30%.

The inventive Composition A (2) at ambient temperature had a stability improvement of 40% and at 100° F. had a stability improvement of 48% as compared to the control (Comparison Composition I).

EXAMPLE 2

An inventive Composition B was prepared which was the same as Composition A except that potassium iodide/iodine were substituted for the potassium iodate and the available chlorine loss was measured after six months instead of after five months.

Two inventive Compositions B were prepared, the first with 0.32% KI and 0.50% $I_2$ and the second with 0.16% KI and 0.25% $I_2$. The Comparative Composition I from Example I was prepared without any KI and $I_2$.

The mole ratio of potassium iodide to available chlorine is 0.018 and 0.036, respectively.

The loss in chlorine activity of the hypochlorite bleach in the inventive Composition B (high alkalinity/high bleach) and the Comparison Composition I were monitored and at ambient temperature (68° F.) and at 100° F. for a period of six (6) months.

The results obtained in available chlorine loss, i.e. loss in chlorine activity are reported in the following Table 2.

TABLE 2

| | 100° F. Temp. | Stabilizing Agent Wt. % KI | $I_2$ | Mole Ratio Stabilizing Agent To Avail. Chlorine | 68° F. (Amb.) Temp. |
|---|---|---|---|---|---|
| Comparison Comp. I | 90% | 0 | 0 | — | 59% |
| Invention Comp. B (1) | 61% | 0.16 | 0.25 | 0.018 | 39% |
| Invention Comp. B (2) | 30% | 0.32 | 0.50 | 0.036 | 20% |
| Invention Comp. B($2_1$) | 22% | 0.32 | 0.50 | 0.036 | 7% |

The inventive Composition B(1) at ambient temperature had a stability improvement of 20%, and at 100° F. had a stability improvement of 29%. The inventive Composition B(2) at ambient temperature had a stability improvement of 39%, and at 100° F. had a stability improvement of 60% as compared to the control. The inventive Composition B($2_1$) when made by an alternate method and order of addition of stabilizing agents, stability of bleach was further improved to 52 to 68% at ambient and 100° F. temperature respectively.

EXAMPLE 3

An inventive Composition B(2) "lemon scent" was prepared, which was the same as Composition B(2) with the exception that 0.1 wt. % of lemon scent was added to inventive Composition B(2). The Composition B(2) "lemon scent" was compared to Comparative Composition I "lemon scent" which was the same as Comparative Composition I, with the exception that 0.1 wt. % of lemon scent had been added.

The loss in chlorine activity of the hypochlorite bleach in the inventive Composition B(2) lemon scent and in the Comparison Composition I lemon scent were monitored and at ambient temperature (68° F.) and at 100° F. for six (6) months.

The results obtained in available chlorine loss, i.e. loss in chlorine activity are reported in the below Table 3.

TABLE 3

| 100° F. Temp. | Stabilizing Agent Wt. % KI | Stabilizing Agent Wt. % $I_2$ | Mole Ratio of KI Stabilizing Agent To Avail. Chlorine | 68° F. (Amb.) Temp. |
|---|---|---|---|---|
| Comparison Comp. I Lemon Scent 95% | 0 | 0 | — | 75% |
| Invention Comp. B (2) Lemon Scent 26% | 0.32 | 0.50 | 0.036 | 22% |

The inventive Composition B(2) lemon scent at ambient temperature had a stability improvement of 53%, and at 100° F. had a stability improvement of 69% as compared to the Comparison Composition I lemon scent.

EXAMPLE 4

In accordance with the present invention aqueous liquid automatic dishwasher detergent compositions were prepared using the below named ingredients in the amounts indicated.

The Composition C is an inventive composition with potassium iodide and iodine and with regular alkalinity and regular bleach content. The Comparative Composition II was prepared with regular alkalinity and regular bleach and without potassium iodide and iodine.

| Ingredients II | Invention Composition C | Comparison Composition |
|---|---|---|
| Deionized Water | Q.S. | Q.S. |
| Sodium Tripolyphosphate Hydrated | 12.00 | 12.00 |
| Sodium Tripolyphosphate Anhydrous | 12.00 | 12.00 |
| Sodium Carbonate | 5.00 | 5.00 |
| Sodium Hydroxide (50%) | 2.40 | 2.40 |
| Dowfax 3B2 Surfactant | 1.00 | 1.00 |
| Sodium Silicate (1) | 15.78 | 15.78 |
| Sodium Hypochlorite (2) | 7.7 | 7.7 |
| Potassium Iodide | 0.32 | — |
| Iodine | 0.50 | — |
| Aluminum Stearate | 0.13 | 0.13 |
| Gel White H Clay | 1.25 | 1.25 |
| LPKn 158 Defoamer | 0.16 | 0.16 |
| Graphtol Green Pigment | 0.002 | 0.002 |

(1) $Na_2O:SiO_2$,1:2.4:(47.5% Solution)
(2) Available Chlorine 1.0 wt. %. A 7.7% of NaC10 (13.5% available chlorine) in the formula gives 1% available chlorine.

The loss in chlorine activity of the hypochlorite bleach in the inventive Composition C (regular alkalinity/regular bleach) and the Comparison Composition II were monitored and measured at ambient temperature (68° F.) and at 100° F. for six (6) months. The results obtained in available chlorine loss, i.e. loss in chlorine activity are reported in the below Table 4.

TABLE 4

| 100° F. Temp. | Stabilizing Agent Wt. % KI | Stabilizing Agent Wt. % $I_2$ | Mole Ratio of KI Stabilizing Agent To Avail. Chlorine | 68° F. (Amb.) Temp. |
|---|---|---|---|---|
| Comparison Comp. I 73% | 0 | 0 | — | 45% |
| Invention Comp. C 1% | 0.32 | 0.50 | 0.071 | 3% |

The inventive Composition C at ambient temperature had a stability improvement of 42%, and at 100° F. had a stability improvement of 72% as compared to the control (Comparison Composition II).

EXAMPLE 5

An inventive composition, Composition C lemon scent, was prepared which was the same as inventive Composition C with the exception that 0.1 wt. % of lemon scent was added to inventive Composition C. The Composition C lemon scent was compared to Composition II to which the same amount of lemon scent had been added.

The loss in chlorine activity of the hypochlorite bleach in the inventive Composition C lemon scent and in the Comparison Composition II lemon scent were monitored and measured and at ambient temperature (68° F.) and at 100° F. for a period of six (6) months.

The results obtained in available chlorine loss, i.e. loss in chlorine activity are reported in Table 5 below.

TABLE 5

| | Stabilizing Agent Wt. % KI | Stabilizing Agent Wt. % $I_2$ | Mole Ratio of KI Stabilizing Agent To Avail. Chlorine | 68° F. (Amb.) Temp. | 100° F. Temp. |
|---|---|---|---|---|---|
| Comparison Comp. I | 0 | 0 | — | 65 | 90 |
| Invention Composition C Lemon Scent | 0.32 | 0.50 | 0.071 | 0 | 0 |

The inventive Composition C lemon scent at ambient temperature had a stability improvement of 65%, and at 100° F. had a stability improvement of 90%.

EXAMPLE 6

In accordance with the present invention a stabilized aqueous liquid bleach composition is formulated using the below named ingredients in the amounts indicated.

| Ingredient | Weight Percent |
|---|---|
| Water | Q.S. |
| Sodium Carbonate | 10.0 |
| Sodium Hydroxide (50%) | 5.0 |
| Sodium Hypochlorite | 38.5 (1) |
| Potassium Iodate | 10.5 (2) |
| Color | 0.004 |
| Perfume | 0.50 |

(1) Available chlorine 5%.
(2) Mole Ratio of potassium iodide to available chlorine 0.36.

The storage stability of the stabilized bleach composition is found to be substantially improved as compared to the bleach composition that does not contain potassium iodate bleach stabilizer.

The foregoing examples show that the aqueous liquid automatic dishwasher detergent compositions of the present invention comprising hypochlorite bleach and potassium iodate bleach stabilizer, or hypochlorite bleach and potassium iodide and iodine bleach stabilizer provide substantially improved bleach stability for a prolonged period of time.

The invention is not to be limited by the above disclosure and examples which are given as illustrations only. The invention is to be interpreted in accordance with the below claims.

What is claimed is:

1. An alkaline aqueous liquid bleach composition having improved bleach stability for use in the cleaning of glassware and dishware which consists of:

(a) chlorine bleach compound capable of forming hypochlorite on addition to water in an amount sufficient to provide 0.5 to 8.0 weight % of available chlorine;

(b) a water soluble iodate bleach stabilizer compound in a sufficient amount to provide a mole ratio of iodate to available chlorine of 0.08 to 1.67, said water soluble iodate being selected from the group consisting of water soluble alkali metal iodates and alkaline earth metal iodides;

(c) 0 to 12.0 weight percent of sodium hydroxide; and (d) balance being water.

2. A method for improving the bleach stability of an aqueous liquid dishwasher composition comprising hypochlorite bleach in a sufficient amount to provide about 1 to 4% of available chlorine which comprises adding to the composition of a water soluble iodate compound bleach stabilizer in a sufficient amount to provide a mole ratio of iodate to available chlorine of 0.36 to 0.75 of said water soluble iodate bleach stabilizer being selected from the group consisting of water soluble alkali and alkaline earth metal iodates.

3. An aqueous liquid dishwasher composition having improved bleach stability comprising approximately by weight:

(a) 0 to 40% inorganic or organic alkali metal detergent builder salt;

(b) 0 to 5% nonionic or anionic organic detergent active material;

(c) 0 to 5% chlorine bleach stable foam depressant;

(d) chlorine bleach compound capable of forming hypochlorite in addition to water in an amount to provide about 0.5 to 5% of available chlorine;

(e) a water soluble iodate bleach compound selected from the group consisting of water soluble alkali and alkaline earth metal iodates in a sufficient amount to provide a mole ratio of iodate to available chlorine of 0.36 to 0.92;

(f) 0 to 12% sodium hydroxide;

(g) at least one thickener selected from the group consisting of clay, silica, fatty acid, fatty acid salts and a crosslinked polycarboxylate polymer said thickener being present in a sufficient amount to provide said composition with a thixotropic index of 1 to 15; and (h) balance being water, said composition having a pH of at least 10.5.

4. The composition of claim 3 wherein the chlorine bleach compound is a member selected from the group of chlorocyanurates, chlorisocyanurates, alkali and alkaline earth hypochlorites.

5. The composition of claim 3 wherein the iodate bleach stabilizer compound is a member selected from the group consisting of water soluble alkali and alkaline earth metal iodates.

6. The composition of claim 3 further including at least one thickener selected from the group consisting of clay, silica, fatty acids fatty acid salts and a crosslinked polycarboxylate polymer said thickener been present in a sufficient amount to provide said composition with a thixotropic index of about 1 to about 15.

7. The composition of claim 3 wherein said composition has 0.1 to 5% organic detergent active material.

8. The composition of claim 3 wherein said composition has 0.5 to 3% organic detergent active material.

9. A method for cleaning soiled dishware which comprises contacting the soiled dishware which comprises contacting the soiled dishware in an automatic dishwashing machine in an aqueous washbath having dispersed therein an effective amount of the composition of claim 68 to obtain clean dishware of reduced soils.

10. An alkaline aqueous liquid bleach composition having improved bleach stability comprising approximately by weight:

(a) 0 to 30% alkali metal carbonate;

(b) chlorine bleach compound capable of forming hypochlorite on addition to water in an amount to provide about 0.5 to 8% of available chlorine;

(c) a water soluble iodate bleach stabilizer compound in a sufficient amount to provide a mole ratio of iodate to available chlorine of 0.36 to 0.92, such iodate bleach stabilizer compound being selected from the group consisting of water soluble alkali and alkaline metal iodates;

(d) 1 to 12% sodium hydroxide;

(e) 0.2 to 5.0% of a nonionic or anionic detergent active material; and (f) balance being water.

11. The composition of claim 10 wherein the iodate bleach stabilizer compound is a member selected from the group consisting of water soluble alkali and alkaline earth metal iodates.

12. The composition of claim 10 wherein the chlorine bleach compound is a member selected from the group of chlorocyanurates, chloroisocyanurates, alkali and alkaline earth hypochlorites.

13. The composition of claim 12 further including about to 10 to about 40.0 wt. % of at least one detergent builder salt wherein said detergent builder salt is selected from the group consisting of alkali metal polyphosphates.

14. The composition of claim 12 further including at least one thickener selected from the group consisting of fatty acids, fatty acid salts, clay, silica and a crosslinked polycarboxylate polymer, said thickener being present in a sufficient amount to provide said composition with a thixotropic index of about 1 to 15.

15. The composition of claim 14 further including 20 to 30 wt. % of alkali metal polyphosphates:

16. An aqueous liquid automatic dishwasher detergent composition having improved bleach stability comprising approximately by weight:

(a) 8 to 40% alkali metal polyphosphate;

(b) 8 to 35% sodium silicate;

(c) 5 to 25% alkali metal carbonate;

(d) less than 5% chlorine bleach stable, water dispersible organic nonionic detergent active material;

(e) less than 5% chlorine bleach stable foam depressant;

(f) chlorine bleach compound selected from the group of alkali metal hypochlorites in an amount sufficient to provide about 1 to 4% of available chlorine;

(g) a water soluble alkali metal iodate bleach stabilizer compound in a sufficient amount to provide a mole ratio of iodate to available chlorine of 0.2 to 1.0;

(h) 0 to 10% of sodium hydroxide; and (i) balance being water.

17. The composition of claim 16 further including at least one thickener selected from the group consisting of clay, silica, fatty acids, fatty acid salts, and a cross-linked polycarboxylate polymer, said thickener being present in a sufficient amount to provide said composition with a thixotropic index of about 1 to about 15.

18. The composition of claim 16 wherein said composition has 8 to 40% sodium polyphosphate.

19. The composition of claim 16 wherein said composition has 20 to 30% alkali metal polyphosphate and 0.1 to 5% organic detergent active material.

20. The composition of claim 16, wherein the chlorine bleach compound is sodium hypochlorite.

21. The composition of claim 20 wherein the alkali metal iodate bleach stabilizer compound is potassium iodate.

22. The composition of claim 20 wherein the alkali metal iodate bleach stabilizer compound is in an amount sufficient to provide a mole ratio of iodate to available chlorine of 0.25 to 0.80.

23. An aqueous liquid bleach containing composition having improved bleach stability comprising approximately by weight at least one ingredient selected from the group consisting of 0.1 to 5.0% nonionic or anionic organic detergent, 8 to 40% of an alkali metal detergent builder salt, 0.01 to 5% of a chlorine bleach stable foam inhibitor and mixtures thereof, and a hypochlorite bleach source sufficient to provide 0.5 to 8 wt. % available chlorine and a water soluble iodate bleach stabilizer compound selected from the group consisting of water soluble alkali and alkaline earth metal iodates in an amount sufficient to provide a mole ratio of iodate to available chlorine of 0.08 to 1.67.

24. The composition of claim 23 wherein the hypochlorite source contains 1.0 to 5 wt. % available chlorine and the water soluble iodate compound bleach stabilizer is in a sufficient amount to provide a mole ratio of iodate to available chlorine of 0.25 to 1.25.

25. A method for improving the bleach stability of an aqueous liquid dishwasher composition comprising 0.1 to 10 wt.% 10 of at least one thickener and hypochlorite bleach in a sufficient amount to provide 1 to 4% available chlorine which comprises adding to the composition a water soluble iodide/iodine bleach stabilizer, therein the mole ratio of iodide to iodine is 2:1 to 1:2 and a sufficient amount of iodide to provide a mole ratio of iodide to available chlorine of 0.18 to 0.080 such water soluble includes being selected from the group consisting of water soluble alkali metal iodides and alkaline earth metal iodides.

26. An aqueous liquid dishwasher composition having improved bleach stability comprising approximately by weight:

(a) 0 to 40% inorganic or organic alkali metal detergent builder;

(b) 2.4 to 40% sodium silicate;

(c) 0 to 5% nonionic or anionic organic detergent active material;

(d) 0 to 5% chlorine bleach stable foam depressant;

(e) chlorine bleach compound capable of forming hypochlorite in addition to water in an amount to provide about 0.5 to 5% of available chlorine;

(f) a water soluble iodide/iodine bleach stabilizer, wherein the mole ratio of iodide to iodine is 2:1 to 1:2, and a sufficient amount of iodide to provide a mole ratio of iodide to available chlorine of 0.036 to 0.092 wherein the iodide bleach stabilizer is a member selected from the group consisting of water soluble alkali and alkaline earth metal iodides;

(g) 0 to 12% sodium hydroxide; and (h) balance being water.

27. The composition of claim 26 wherein the chlorine bleach compound is a member selected from the group of chlorocyanurates, chloroisocyanurates, alkali and alkaline earth hypochlorites.

28. The composition of claim 26 wherein the iodide bleach stabilizer is a member selected from the group consisting of water soluble alkali and alkaline earth metal iodides.

29. The composition of claim 26 further including a thickener selected from the group consisting of clay, silica, fatty acids, fatty acid salts, polyacrylate polymer and polycarboxylate said thickener being present in a sufficient amount to provide said composition with a thixotropic index of about 1 to about 15.

30. The composition of claim 26 wherein said composition has 8 to 40% inorganic or organic alkali metal detergent builder.

31. The composition of claim 26 wherein said composition has 8 to 40% inorganic or organic detergent builder salt and 0.1 to 5% organic detergent active material.

32. An aqueous liquid dishwashing detergent composition having improved bleach stability comprising approximately by weight at least one ingredient selected from the group consisting of 0.1 to 5.0% of a nonionic or anionic organic detergent, 8 to 40% of at least one alkali metal detergent builder salt, 0.01 to 5% of a chlorine bleach stable foam inhibitor and mixtures thereof, and a hypochlorite bleach source sufficient to provide 0.5 to 5 wt.% available chlorine and water soluble iodide/iodine bleach stabilizer wherein the mole ratio of iodide to iodine is 2:1 to 1:2 and a sufficient amount of iodide to provide a mole ratio of iodide to available chlorine is 0.008 to 0.167 , said water soluble iodide being selected from the group consisting of water soluble alkali and alkaline earth metal iodides.

33. The composition of claim 32 wherein the hypochlorite source contains 1.0 to 4 wt.% available chlorine and the iodide/iodine bleach stabilizer is in a sufficient amount to provide a mole ratio of iodide to available chlorine of 0.025 to 0.125.

34. An aqueous liquid automatic dishwasher detergent composition having improved bleach stability comprising approximately by weight:

(a) 8 to 40% alkali metal polyphosphate;

(b) 8 to 35% sodium silicate;

(c) 5 to 25% alkali metal carbonate;

(d) 0 to 5% chlorine bleach stable, water dispersible organic nonionic or anionic detergent active material;

(e) 0 to 5% chlorine bleach stable foam depressant;

(f) chlorine bleach compound selected from the group of alkali metal hypochlorites in an amount sufficient to provide about 1 to 4% of available chlorine;

(g) a water soluble iodide/iodine bleach stabilizer, wherein the mole ratio of iodide to iodine is 2:1 to 1:2, and a sufficient amount of iodide to provide a mole ratio of iodide to available chlorine of 0.18 to 0.080 such water soluble iodide being selected from the group consisting of water soluble alkali and alkaline with metal iodides provide a mole ratio of iodide to available chlorine of 0.025 to 0.060;

(h) 1 to 10% of sodium hydroxide; and (i) balance being water.

35. The composition of claim 34 wherein the alkali metal iodide is potassium iodide.

36. The composition of claim 34 wherein the alkali metal iodide is in an amount sufficient to provide a mole ratio of alkali metal iodide to available chlorine of 0.020 to 0.070.

37. The composition of claim 34 further including a thickener selected from the group consisting of clay, silica, fatty acids, fatty acid salts, and crosslinked polycarboxylate polymer, said thickener being present in a sufficient amount to provide said composition with a thixotropic index of about 1 to about 15.

38. The composition of claim 34 wherein said composition has 10 to 40% alkali metal polyphosphate and 0.2 to 5% organic detergent active material.

39. The composition of claim 34 wherein the chlorine compound is sodium hypochlorite.

40. The composition of claim 39 wherein said composition has 20 to 30% alkali metal polyphosphate and 0.5 to 3% organic detergent active material.

41. A method for cleaning soiled dishware which comprises contnacting the soiled dishware in an automatic dishwashing machine in an aqueous washbath having dispersed therein an effective amount of the composition of claim 34 to obtain clean dishware of reduced soils.

42. An aqueous liquid automatic dishwasher detergent composition having improved bleach stability comprising approximately by weight:

(a) 8 to 40% alkali metal polyphosphate;

(b) 8 to 35% sodium silicate;

(c) 5 to 25% alkali metal carbonate;

(d) 0.1 to 5% chlorine bleach stable, water dispersible organic nonionic or anionic detergent active material;

(e) 0.1 to 5% chlorine bleach stable foam depressant;

(f) 7.7 to 30.8 sodium hypochlorite in an amount sufficient to provide about 1 to 4% of available chlorine;

(g) a water soluble potassium iodide/iodine bleach stabilizer, wherein the mole ratio of iodide to iodine is about 1:1, wherein the potassium iodide is present in a sufficient amount to provide a mole ratio of iodide to available chlorine of 0.025 to 0.060;

(h) 1 to 10% of sodium hydroxide; and (i) balance being water.

43. The composition of claim 42 further including at least one thickener selected from the group consisting of clay, silica, fatty acids, fatty acid salts, and a crosslinked polycarboxylate polymer, said thickener being present in a sufficient amount to provide said composition with a thixotropic index of about 1 to about 15.

44. The composition of claim 42 wherein said composition has 20 to 30% sodium polyphosphate.

45. The composition of claim 42 wherein said composition has 20 to 30% alkali metal polyphosphate and 0.2 to 5% organic detergent active material.

* * * * *